Oct. 8, 1935.  S. M. ROTH  2,016,727
POWER REVERSE GEAR
Filed Aug. 17, 1932    2 Sheets-Sheet 2

INVENTOR
STEWART M. ROTH,
BY
Stone, Boyden, Mack & Hahn
ATTORNEYS

Patented Oct. 8, 1935

2,016,727

UNITED STATES PATENT OFFICE 2,016,727

POWER REVERSE GEAR

Stewart M. Roth, Hagerstown, Md.

Application August 17, 1932, Serial No. 629,199

4 Claims. (Cl. 121—41)

This invention relates to a power actuated reversing gear for the valve mechanisms of steam engines.

More particularly, the invention pertains to such reversing gears as are applied to those of locomotives, and its primary object is to provide means whereby absolute control by the operator, and a high degree of precision in adjusting, may be attained and insured.

The invention is further characterized more specifically by the provision of an improved fluid pressure operated means for changing the position of steam engine valves in order to control the direction of motion of the engine; the provision of manual control means, whereby the engineman may maintain full control of the position of the valve, and without any great effort on his part for moving the valves. Furthermore, the valves are securely maintained in set position, and lost motion is in a large degree eliminated.

Another object of the invention is to provide means whereby the fluid distribution mechanism may be securely locked in a precise and predetermined indicated position.

Another object is the provision of means whereby the reversing gear mechanism may be actuated manually and quickly from the same position in the engine cab in the event of failure of the fluid pressure means.

A further object of the invention is the provision of an indicator, in the engine cab, for showing the position of cut-off effected by either control means.

In the operation of locomotives, and especially of the larger types, a great deal of force is required to move the valve gears of such locomotive. This invention provides means for operating such valve gears by the use of compressed air or steam, and provides operating means which will be locked against the influence of the valve gear mechanism in order to prevent any movement of said valve gear from being transmitted to the fluid pressure operated means, and to lock the valve gear in positions in which it is set.

Figure 1:
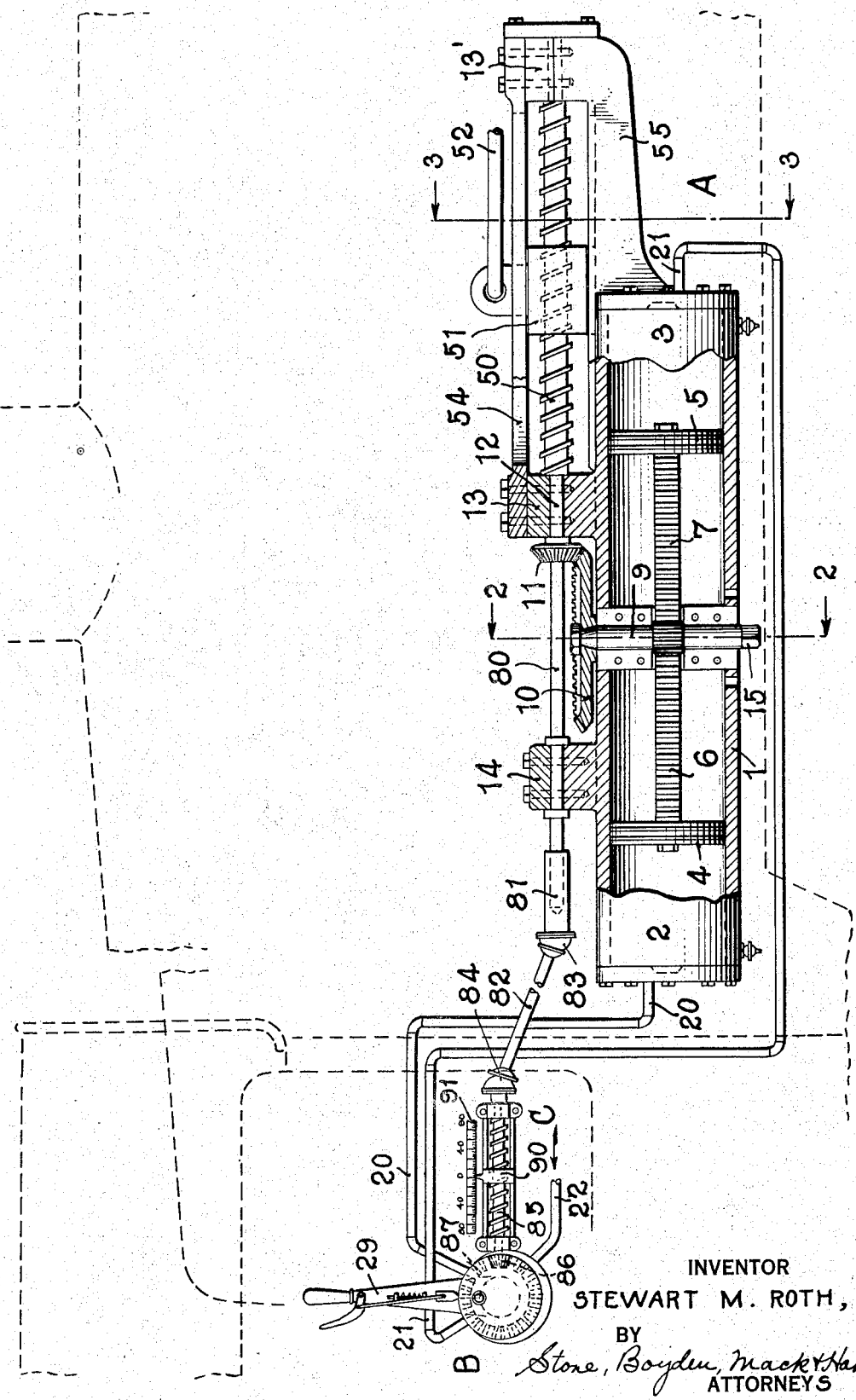
Figure 1 is a fragmentary diagrammatic side elevation of a locomotive equipped with the improvements.
Figure 2:
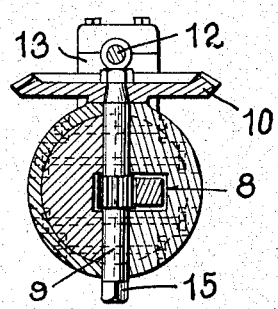
Fig. 2 is a cross section of the reversing mechanism taken on the line 2—2 of Fig. 1.
Figure 3:
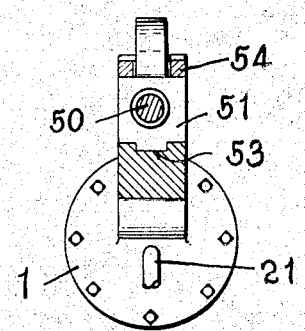
Fig. 3 is a cross section taken on the line 3—3 of Fig. 1.
Figure 4:
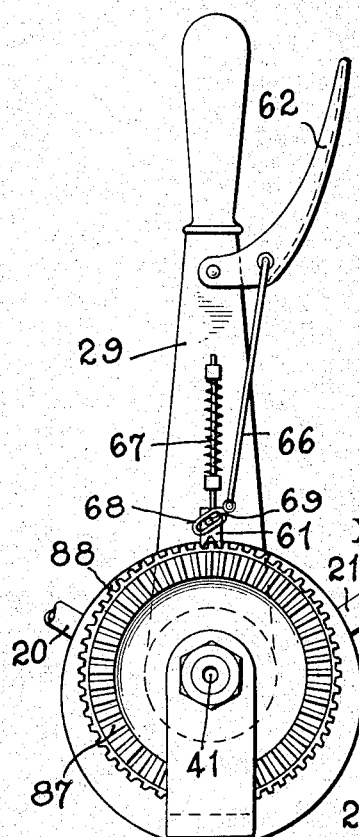
Fig. 4 is a vertical side elevation view of Fig. 5 viewed in the direction indicated by X.
Figure 5:
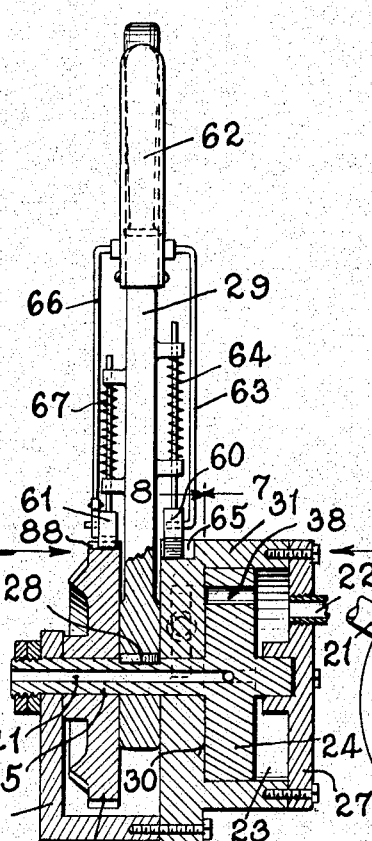
Fig. 5 is a combined sectional and vertical view of the valvular mechanism mounted in the engine cab.
Figure 6:
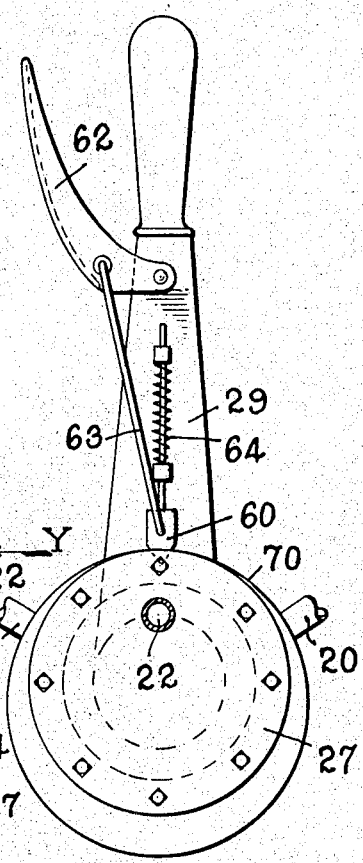
Fig. 6 is a vertical side elevation, viewed in the direction indicated by Y.
Figure 7:
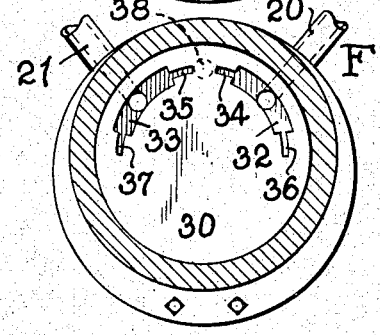
Fig. 7 is a cross section taken on the line 7—7 of Fig. 5.
Figure 8:
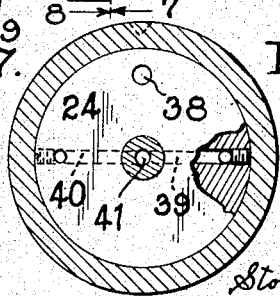
Fig. 8 is a cross section taken on the line 8—8 of Fig. 5.

Referring to the drawings, the reference character A represents the power reverse cylinder and its auxiliary parts mounted on the side of the locomotive; the reference character B the operating and valvular mechanism mounted in the locomotive cab, and the reference character C represents the cut-off indicating mechanism located in view of the engineman.

In general, the gear comprises a cylinder 1, having cylinder portions 2, 3, within which is mounted a piston structure including pistons 4, 5, connected by a rack bar 6. This rack bar is preferably square and is provided with rack teeth 7 and is supported by means of a bearing 8, which also serves as a bearing for the vertical shaft 9, mounting the bevel gear 10.

The bevel gear 10 is in mesh with a pinion gear 11 mounted on the shaft 12, which shaft is in turn supported by the bearing 13.

The rack bar 6 and the shaft 9 have a rack-and-pinion engagement and the relation of the teeth on the rack to the teeth on the pinion is such that a full throw of the rack bar 6, will cause several revolutions of the bevel gear 10.

In order to operate the pistons 4 and 5, there are formed in the cylinder heads passages 20 and 21, for the purpose of admitting and exhausting fluid under pressure to and from the opposite ends of the cylinder structure. The fluid under pressure coming from a suitable source of supply (not shown) and introduced at 22, is controlled by a valve mechanism shown generally at B in Fig. 1 and also in Figs. 5, 6, 7 and 8.

The controlling valve comprises a valve chamber 23 having therein a rotary valve 24, carried by a shaft 25 journaled in the supporting member 26 and in the valve chamber closure 27. This rotary valve is keyed at 28 to a reverse lever 29, mounted so as to be angularly movable in a vertical plane. The rotary valve 24, seats firmly against the valve seat 30 which seat is preferably machined in the valve chamber casing 31. The valve seat has machined therein channels or passages 32 and 33 communicating with the passages 20 and 21, respectively.

The rotary valve is provided with passages 38, 39 and 40 for a purpose about to be described. The rotary valve shaft 25 has a passage 41 therein, communicating with passages 39 and 40 and the atmosphere.

Fluid under pressure is introduced into the chamber 23 by means of pipe 22 and is controlled by the valve 24. To make a forward movement of the reverse gear the reverse lever 29 in Fig. 1 is moved to the right (or forward) thereby permitting the passage 38 in the rotary valve to register with passage 32 in the valve seat and permitting fluid under pressure to admit itself to the cylinder portion 2, by way of the passage or pipe 20, and therein to exert fluid pressure upon the piston 4. This in turn causes the rack bar 6 to move to the right, thereby rotating bevel gear 10 in a clockwise direction and this in turn rotating the pinion gear in a clockwise direction (when viewed from the right in Fig. 1) to rotate the shaft 12. Integral with the shaft 12, there is provided a screw shaft or reversing rod 50, which is horizontally mounted and journaled at 13 and 13'. In the operation just referred to, the screw shaft 50 will also rotate clockwise. Mounted upon the shaft 50 is a block 51, provided with complemental screw threads, which block at its upper portion is attached to a reach rod 52 which in turn is secured to the locomotive valve gear to be operated (but not shown herein).

The block 51 is very similar to a cross-head and to guide it properly, it is held slidingly between the bottom track 53 and the spaced horizontal guides 54, 54. A cross-head guide support 55 is mounted upon and attached to the cylinder.

This clockwise rotation of the shaft 50 will therefore cause the block 51 to move to the right, thereby moving the reach rod 52 to the right, for the forward movement of the valve gear.

It is to be noted that the reverse lever 29 is provided with two latches 60 and 61, actuated by a common handle 62 pivoted to the lever 29. Latch 60 is actuated by means of link 63 and is normally urged downwardly by spring 64 so that the latch 60 engages a notch 65 formed in the valve casing at a point corresponding to the neutral or vertical position of the lever 29. Latch 61 is provided with a notch similar to the shape of a gear tooth and is actuated by the handle 62, link 66 and is normally urged downwardly by the spring 67. Link 66 is pivoted to a second link 68 which fits over a protruding pin 69 on the latch 61. The link 68 is provided with an elongated slot so that upon the actuation of the common handle 62, latch 60 will be the first to be raised free of the notch 65 and latch 61 will be somewhat delayed in its upward movement until the lower edge of the elongated slot engages pin 69 whereupon latch 61 will be raised free of the gear teeth, in a manner to be described. Latch 60, when raised free of the notch 65, frictionally engages a smooth segment 70 formed on the upper surface of the valve casing for a substantial angular extent.

Therefore, when the reverse lever 29 is moved forward, both latches 60 and 61 have been released and latch 60 rides with a frictional contact on the segment 70.

Provision is made for automatically returning the rotary valve to the neutral position when the valve gear has moved the required extent. To this end, the shaft 80, axially aligned with shaft 12 and journaled in bearings 14, is secured to the shaft 82 by joint 81 and the universal joint 83. The screw shaft 85, mounted in the engine cab, is rotated by shaft 82 and the intervening universal joint 84. The screw shaft bears pinion gear 86 which in turn engages the bevel teeth 87 of a combined bevel and straight gear 89. The straight gear teeth 88 are formed on the outer periphery of the gear 89. Gear 89 is mounted upon the shaft 25 but is not fixed thereto, having merely a frictional bearing thereon.

The position of cut-off, indicated in percentage, is indicated by the screw block 90 and an index finger contacting with a scale 91, the screw block 90 being threaded on the shaft 85, the threads of which are proportionate to the threads on the shaft 50. Thus it will be seen that a movement of the gear is proportionately indicated by the screw block indicator 90.

Assuming that the reverse lever 29 has been moved forward, as explained, and that the latch 60 has made frictional contact with the segment 70 and the desired cut-off has been duly indicated to the engineman, the engineman releases his grip upon handle 62, latch 61 will be urged into engagement with gear teeth 88, thereby forming an operable connection between the driven gear 89 and the reverse lever 29. Consequently, gear 89, which is rotating counter-clockwise (Fig. 1) will serve to return the reverse lever to its neutral position and since this lever is keyed to the rotary valve shaft, the rotary valve will be automatically returned to neutral position. In this position the exhaust fluid from chamber 2 will pass through passage 20, passage 32, passage 39 and passage 41 to the atmosphere.

The operation of the reverse gear for backward motion is exactly the same as for forward motion except that the reverse lever 29 is moved in the opposite direction and the rotary valve functions so as to cause the space 3 and piston 5 to be used, piston 5 moving to the left (Fig. 1).

Very often, the valve gear must be moved but a very little amount beyond an initial setting of the gear. To accomplish this fractional movement or increment, the reverse lever and valve need be moved but a slight amount so that passage 38 will register with constricted passage 34. Since the fluid can not pass into the cylinder under full pressure but is held back by this constricted passage, the piston 4 will be moved but a slight amount but enough to accomplish what is known as precision movement. In this manner, the engineman has absolute control of the valve gear, for all movements from fractional amounts up to the full amount. By providing a constricted passage for a portion of the fluid passage, precision adjustment is possible.

It is conceivable that at some time, there might be a complete failure of fluid pressure for actuating the reverse mechanism, due to many causes. In such a case, absolute control is still maintained over the valve gear. The engineman can then resort to manual operation, accomplishing this by moving the reverse lever forward, permitting the latch 61 to engage teeth 88 and then manually retracting the lever 29. He does this a sufficient number of times until the indicator 90 shows that the proper cut-off has been obtained. Such operation is of course slower than the fluid pressure operation, but it is certain and meets in every detail, the rigid requirements for auxiliary manual control demanded by modern railway commissions and governmental agencies.

The manual operation in backward motion is exactly the same as in forward motion, except that the reverse lever is moved in the opposite direction from that just described.

The two latches 60 and 61 also form a positive means for preventing creeping of the valve mechanism due to any movement of the reach rod 52 after the correct cut-off has been obtained. Creeping, caused by ordinary wear of the parts or faulty design is obviated by the construction described.

Should the manual control also fail, in addition to the fluid pressure control, the engineman can still reverse his engine. The engine is brought to a standstill and the engineman can leave his cab and apply a wrench to the extension 15, forming a part of shaft 9. Thereupon the shaft 9 may be manually rotated to move the valve gear to the position desired.

Therefore, barring a complete failure of fluid pressure necessary to propel the engine, there are, as disclosed herein, three ways of compelling the engine to function and this is highly desirable in the efficient and economical operation of locomotives, to say nothing of the highly important safety factor.

I claim:

1. In a power reverse gear mechanism having a fluid pressure motor and valvular mechanism for controlling the motive fluid to and from the motor, the combination of a manually operated reverse lever having means for actuating said valvular mechanism to admit fluid under pressure to said motor to move the same, transmission means actuated by said motor, a gear driven by said transmission means, a manually controlled latch member carried by said reverse lever and engageable with said gear in one position whereby said reverse lever forms a common connector between said gear and said valvular mechanism, and disengageable from said gear for manual actuation of the valve mechanism, said driven gear returning said valvular mechanism to neutral position when first engaged by said latch member upon completion of the desired movement of said motor.

2. In a power reverse gear mechanism having a fluid pressure motor and valvular mechanism for controlling the motive fluid to and from the motor, the combination of a manually operated reverse lever secured to a shaft to which said valvular mechanism is secured whereby said valvular mechanism may be actuated to admit fluid under pressure to said motor to move the same, transmission means actuated by said motor, a gear driven by said transmission means, a manually controlled latch member carried by said reverse lever and engageable with said gear in one position whereby said reverse lever forms a common connector between said gear and said valvular mechanism, and disengageable from said gear for manual actuation of the valve mechanism, said driven gear returning said valvular mechanism to neutral position when first engaged by said latch member upon completion of the desired movement of said motor.

3. In a power reverse gear mechanism having a fluid pressure motor and valvular mechanism for controlling the motive fluid to and from the motor, the combination of a manually operated reverse lever secured to a shaft to which said valvular mechanism is secured whereby said valvular mechanism may be actuated to admit fluid under pressure to said motor to move the same, transmission means actuated by said motor, a gear driven by said transmission means, a manually controlled latch member carried by said reverse lever and engageable with said gear in one position whereby said reverse lever forms a common connector between said gear and said valvular mechanism, and disengageable from said gear for manual actuation of the valve mechanism, means carried by said reverse lever for locking said valvular mechanism in neutral position, said driven gear returning said valvular mechanism to neutral position when first engaged by said latch member upon completion of the desired movement of said motor.

4. In a power reverse gear mechanism having a fluid pressure motor and valvular mechanism for controlling the motive fluid to and from the motor, the combination of a manually operated reverse lever secured to a shaft to which said valvular mechanism is secured whereby said valvular mechanism may be actuated to admit fluid under pressure to said motor to move the same, transmission means actuated by said motor, a gear frictionally secured to said shaft and driven by said transmission means, a manually controlled latch member carried by said reverse lever and engageable with said gear in one position whereby said reverse lever forms a common connector between said gear and said valvular mechanism, and disengageable from said gear for manual actuation of the valve mechanism, said driven gear returning said valvular mechanism to neutral position when first engaged by said latch member upon completion of the desired movement of said motor.

STEWART M. ROTH.